H. P. HASKIN.
Improvement in Earth-Augers.
No. 132,072.  Patented Oct. 8, 1872.
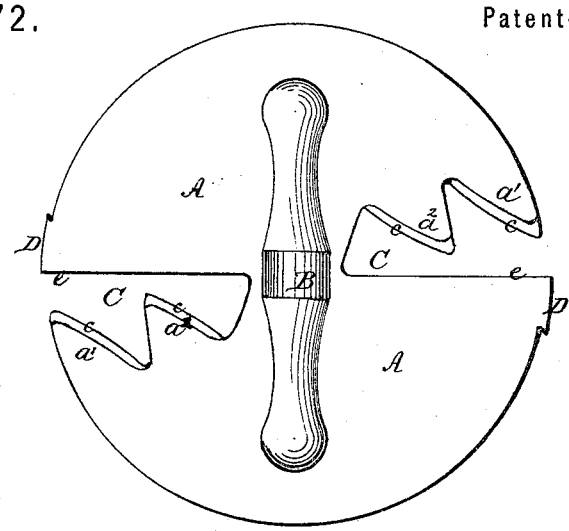
Fig. 1.
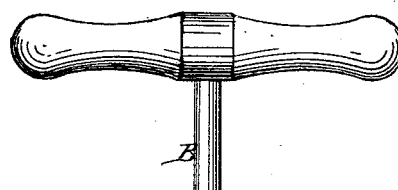
Fig. 2.
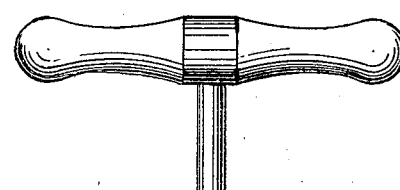
Fig. 3.
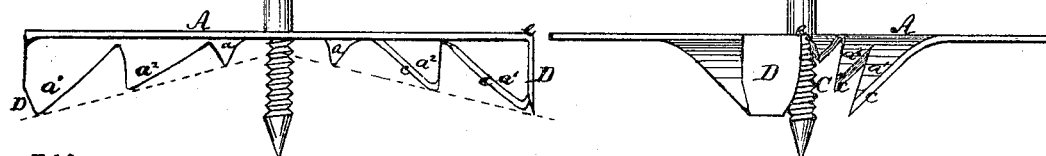
Witnesses:
Augustus H. Girard.
J. West Wagner.
Inventor:
Henry P. Haskin
By Johnson Haueke & Co.
his Attorneys.

UNITED STATES PATENT OFFICE.

HENRY P. HASKIN, OF ROSCOE, ILLINOIS.

IMPROVEMENT IN EARTH-AUGERS.

Specification forming part of Letters Patent No. 132,072, dated October 8, 1872.

*To all whom it may concern:*

Be it known that I, HENRY P. HASKIN, of Roscoe, in the county of Winnebago and State of Illinois, have invented a new and useful Improvement in Post-Hole Augers, of which the following is a specification:

My improvement relates to that class of ground-augers having a disk with openings on opposite sides of the center, for balancing the operation of the auger; and my said improvement consists in the peculiar form of the auger-bits or cutting-teeth—that is to say, having a shape like saw-teeth, inclining downward from the top and of unequal length, with their inner sides beveled to form a cutting-edge, which enters and passes through the ground with a draw-knife stroke, to disintegrate small roots, and facilitate the entrance and passage of the teeth through the soil, and thus render the operation faster.

The borer consists of a single plate or disk, A, secured to a stem or handle, B, in any suitable manner. Openings C are made in the disk diametrically opposite, extending from the circumference to near the center, and from one side of each project saw-tooth shaped teeth $a$, so as to enter the ground when the disk is turned to the right. These teeth $a$ are of unequal length, the outer ones, $a^1$, being the longest, and the inner ones, $a^2$, the shortest. Their inner edges, $c$, are beveled, and are inclined outward from the center, so as to make a draw-knife cut in passing through the soil, cutting the roots and light obstructions, and disintegrating the soil as they are turned through it, thus rendering the borer of easier operation.

The cutting-teeth, by their downward inclination from the plane top surface of the disk, raise the earth as they enter it, and cause it to pass up through the openings C above the disk. The downward position of the teeth, in fact, serves to screw the disk into the earth, and to force the loose earth up to the top of the plate. The lines of the opposite sets of teeth form a cone from the center to the circumference of the disk, as shown by dotted lines in Fig. 2, and by this means very effectually cut through the soil, as they are screwed into it, and enabling the boring to be done faster. Vertical cutters D project from the plane edges $e$ of the bisected disk, in advance of the outer-inclined teeth $a^1$, for cutting the sides of the hole before the earth is disturbed by the teeth. These vertical cutters D are of equal projection with the longest of the cutting-teeth $a^1$, and also serve to trim the sides of the post-hole. The inner short teeth $a^2$, also form vertical cutters and keep the throat of the openings always perfectly clear and free from choking. The toothed sides of the bisected plate are slightly raised above the plane edges, to give to the plate a slight screw-twist, and cause it to enter the ground freely as the teeth cut their way. The stem is provided with a screw-point below the disk to center and guide the borer.

The disk may be raised up out of the hole from time to time to remove the earth which gathers upon its upper side.

In the accompanying drawing, Figure 1 represents a plan view; Figs. 2 and 3 are elevations, showing the teeth in different positions.

Having described my invention, I claim—

1. The disk post-hole borer A, having teeth $a$ $a^1$ $a^2$ extending downward from its bisected sides, of unequal length, and with outwardly-inclined inner cutting-edges C, in combination with the vertical cutters D, arranged and operating as described.

2. The peculiar-shaped inclined cutting-teeth, as described.

In testimony whereof I have hereunto set my hand in the presence of two witnesses, this 30th day of July, A. D. 1872.

HENRY P. HASKIN.

Witnesses:
R. TATTERSHALL,
H. G. HEFFRON.